United States Patent [19]

Saitou

[11] Patent Number: 4,663,637

[45] Date of Patent: May 5, 1987

[54] TRANSFER MATERIAL HOLDING CASSETTE

[75] Inventor: Masao Saitou, Kamakura, Japan

[73] Assignee: Kabushiki Kaisha Toshiba, Kawasaki, Japan

[21] Appl. No.: 887,479

[22] Filed: Jul. 21, 1986

Related U.S. Application Data

[63] Continuation of Ser. No. 733,887, May 14, 1985, abandoned.

[30] Foreign Application Priority Data

May 15, 1984 [JP] Japan .................................. 59-99475

[51] Int. Cl.⁴ .............................................. G01D 15/10

[52] U.S. Cl. ................................ 346/76 PH; 346/105; 400/120; 400/208

[58] Field of Search .................. 346/76 PH, 105, 106; 400/120, 207, 208; 250/318; 214/216 PH

[56] References Cited

U.S. PATENT DOCUMENTS 3,869,202 3/1975 Tabata et al. .................. 346/76 PH
4,449,838 5/1984 Okamura et al. .................. 400/234
4,499,500 2/1985 Nagashima .......................... 358/300

FOREIGN PATENT DOCUMENTS 574820 4/1976 Switzerland ........................ 400/208
2100673 1/1983 United Kingdom ........... 346/76 PH

*Primary Examiner*—Arthur G. Evans
*Attorney, Agent, or Firm*—Schwartz, Jeffery, Schwaab, Mack, Blumenthal & Evans

[57] ABSTRACT

An improved transfer material holding cassette of the type including transfer material in the form of ribbon, two cores and a case is disclosed. The case is formed with an opposing pair of guides and the inoperative position of the guides is determined offset from the operative position where two supporting members are mechanically engaged to the guides in the housing of an image building apparatus. When the support members are practically engaged to the guides, the inner wall of each of the guides is brought in uniform close contact with the outer surface of each of the support members under the effect of elastic force generated by engagement of the latter to the guides. Thus, any uneven area on the guides which is developed at a time of molding can be automatically eliminated by fitting the transfer material holding cassette to the holding of the apparatus.

3 Claims, 17 Drawing Figures

TRANSFER MATERIAL HOLDING CASSETTE

This application is a continuation of application Ser. No. 733,887 filed May 14, 1985, now abandoned.

BACKGROUND OF THE INVENTION

1. Field of the Invention

The present invention relates to a transfer material holding cassette and more particularly to improvement of or relating to a transfer material holding cassette of the type including a transfer material of which one surface is coated with a properly selected coloring agent, two cores for reciprocably displacing the transfer material in such a manner as to wind the latter about the one core and unwind it from the other one and a case for housing therein the transfer material and the cores.

2. Description of the Prior Art

As is well known, a transfer material holding cassette of the above-mentioned type is used for an image building apparatus in which an image is built by transferring coloring agent on the transfer material onto a material to be image transferred. This type of transfer material holding cassette is generally constructed such that a pair of cores with transfer material wound thereabout are rotatably supported in a case with a pair of openings formed thereon at the position located corresponding to the cores and the transfer material unwound from the one core is extended through the openings to be wound about the other one. Further, the conventional transfer material holding cassette is provided with guides at the position located in the vicinity of the pair of openings so as to smoothly guide reciprocable movement of the transfer material and the guides are generally designed in the arch-shaped configuration. When it is fitted to a housing of the image building apparatus in which an image is built by transferring coloring agent on the transfer material to be image transferred, a pair of cassette support shafts fixedly secured to the housing are inserted into elongated hollow space as defined by the inner walls of the guides.

However, due to the fact that the support shafts are engaged to the guides by loose fitting it is often found that an uneven area on the guides which is developed when the latter are molded of resin together with the case is still not eliminated after completion of fitting operation. This leads to problems that straightness required for the guides fails to be obtained and thereby malfunction such as dislocating of transfer material, snake motion of the same or the like takes place.

SUMMARY OF THE INVENTION

Thus, the present invention has been made with the foregoing problems in mind and its object resides in providing an improved transfer material holding cassette which assures that any uneven area on the guides are correctly straightened when a pair of cassette support members fixedly secured to the housing are operatively engaged to the guides at a time of fitting the transfer material holding cassette to the housing of the image building apparatus.

To accomplish the above object there is proposed a transfer material holding cassette of the type including a transfer material in the form of ribbon or tape of which one surface is coated with properly selected coloring agent, first and second cores for reciprocably displacing the transfer material in such a manner as to wind the latter about the one core and unwind it from the other one, a case for housing therein the transfer material and both the cores, first and second guides formed at the fore end of the arm-shaped parts of the case to smoothly guide reciprocable movement of the transfer material between both the cores, the first guide being located corresponding to the first core and the second guide being located corresponding to the second core, and first and second support members disposed in parallel with the axis of a platen roller in the housing of an image building apparatus in which a required image is built on a material to be image transferred which is displaced as the platen roller is rotated wherein image building is effected by transferring coloring agent on the transfer material onto the material to be image transferred, the first support member being mechanically engaged to the first guide and the second support member being mechanically engaged to the second guide so that the transfer material holding cassette is detachably fitted to the housing of the image building apparatus, wherein the improvement consists in that the inoperative position of the first and second guides relative to the first and second support members is previously dislocated from the operative position of the first and second guides which is to be assumed by the latter when the first and second support members are engaged to the first and second guides whereby the inner wall of each of the guides is brought in uniform close contact with the outer surface of each of the support members under the operative condition.

By virtue of the arrangement of the transfer material holding cassette made in that way any uneven area on the guides which has been developed when they are molded integrally with the case can be correctly eliminated and straightened without fail by engaging the cassette support members to the guides and thereby hitherto known malfunction such as inclined movement of the transfer material, snake motion of the same or the like can be effectively inhibited from occurrence.

Other objects, features and advantages of the invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail hereunder with reference to the accompanying drawings which illustrate a preferred embodiment thereof.

First, description will be made as to an image building apparatus with a transfer material holding cassette of the invention incorporated therein with reference to FIGS. 1 to 3 which schematically illustrate the whole structure of the apparatus.

Figure 1:
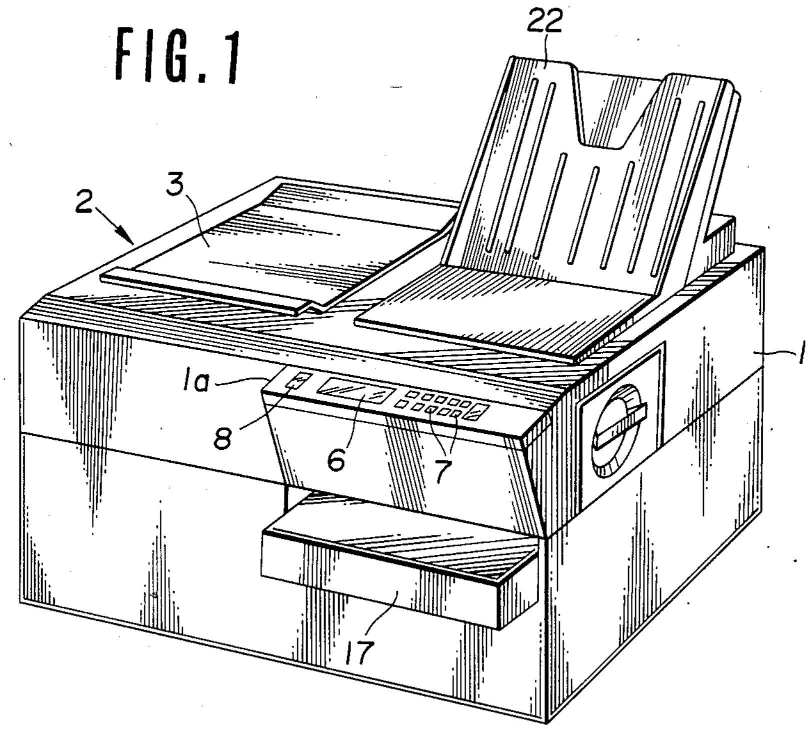
FIG. 1 is a perspective view of an image building apparatus with a transfer material holding cassette of the invention incorporated therein, illustrating the whole appearance of the image building apparatus.

FIG. 1 is a perspective view of the image building apparatus, particularly illustrating the whole appearance thereof. FIG. 2 is a partially exploded perspective view of the apparatus, particularly illustrating how the whole apparatus is constructed. FIG. 3 is a vertical sectional view of the apparatus. In the drawings reference numeral 1 designates a housing of the apparatus. The housing 1 is provided with a control board 1*a* on the upper front wall of the apparatus. Further, the apparatus includes an original platform 2 on the upper surface of the housing 1 in the lefthand area of the latter as seen in the drawing and a cover 3 is placed on the original platform 2. An original scanning section (scanner)4 adapted to scan an original set on the original platform 2 is disposed at the position located below the original platform 2 in the housing 1 and the righthand side of the housing 1 constitutes an image building section (printer) 5.

Figure 2:
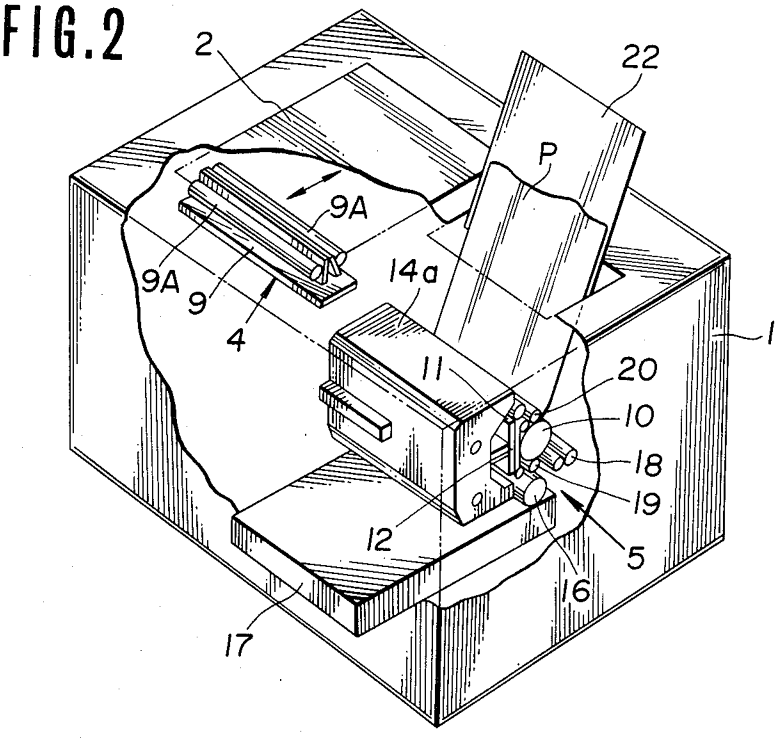
FIG. 2 is a partially exploded perspective view of the image building apparatus in FIG. 1, particularly illustrating how essential components are arranged in the apparatus.

As illustrated in FIG. 2, the original scanning section 4 is so constructed that a movable scanning portion 9 disposed in the optical exposure system moves in parallel with the lower surface of the original platform 2 to optically scan the original and thus obtained optical information is photoelectrically converted into electrical signals which are input into the image building section 5.

Figure 3:
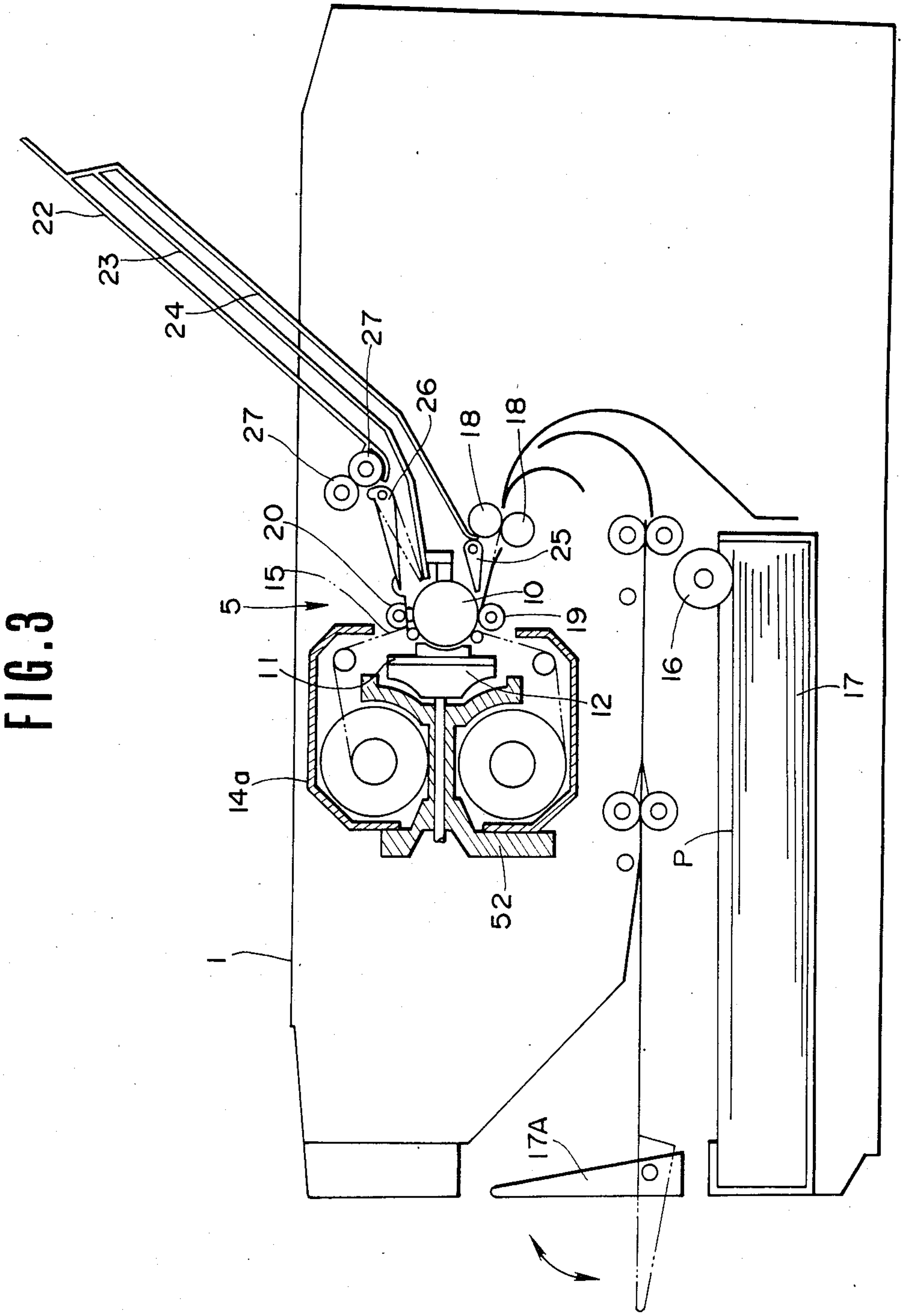
FIG. 3 is a vertical sectional side view of the image building apparatus in FIG. 1.

Specifically, the image building section 5 is constructed in such a manner as illustrated in FIGS. 2 and 3. Namely, a platen 10 is disposed at the position located substantially in the middle of the image building section 5 and a thermal head 11 serving as recording head is disposed in front of the platen 10 (leftwardly of the latter as seen in FIG. 3) so as to move toward the platen and away from the same.

The thermal head 11 is attached to a holder 12 with a heat radiating board interposed therebetween. Further, the apparatus includes a thermal transfer ribbon cassette (hereinafter referred to simply as ribbon cassette) 14 serving as thermal transfer material holding cassette which is supported in the image buidling section 5 with the aid of a bracket 52 and a thermal tlransfer ribbon 15 serving as thermal transfer material is extended through the space as defined between the thermal head 11 and the platen 10.

A paper feeding roller 16 is disposed at the position located below the platen 10 so that papers P serving as material to be image transferred which are received in a paper feeding cassette 17 are taken out therefrom one by one. A paper P thus taken out from the paper feeding cassette 17 is brought to a pair of regist rollers 18 which are located above the paper feeding roller 16 so that the foremost end of the paper P is correctly oriented. Thereafter, it is displaced toward the platen 10 and it is then held on the platen 10 in the partially wound state with the aid of thrust rollers 19 and 20. Thus, as the platen roller 10 is rotated, the paper P is correctly displaced further without any occurrence of slippage. It should be added that the apparatus is provided with a manual paper feeding guide 17A on the front side of the housing 1 at the position located above the left end of the paper feeding cassette 17 in order that a paper is manually fed into the apparatus therethrough.

Figure 4:
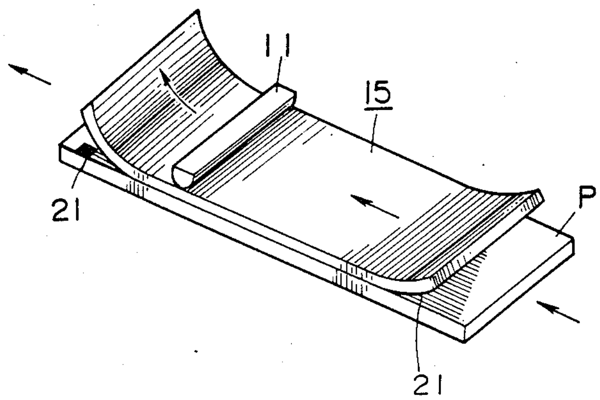
FIG. 4 is a schematic perspective view illustrating how the transfer material is used in cooperation with a material to be image transferred.

On the other hand, the thermal head 11 is adapted to thrust paper P against the platen 10 with the thermal transfer ribbon 15 serving as thermal transfer material interposed therebetween. Thus, as illustrated in FIG. 4, ink 21 serving as coloring agent on the thermal transfer ribbon 15 is molten under the influence of elevated temperature of the thermal head 11 and molten ink is then transferred onto the paper P.

Next, description will be made below as to the thermal transfer ribbon 15.

Figure 5:
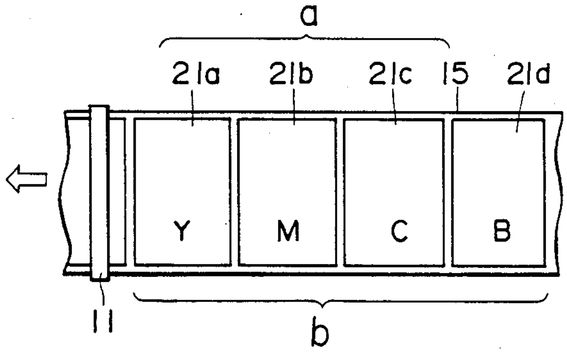
FIG. 5 is a fragmental plan view of a thermal transfer ink ribbon serving as transfer material, particularly illustrating how a plurality of ink sections are arranged one after another on the thermal transfer ink ribbon.

As illustrated in FIG. 5, the thermal transfer ribbon 15 has the substantially same width as that of paper P and includes three ink sections 21*a*, 21*b* and 21*c* arranged one after another in the longitudinal direction. In the illustrated embodiment a color of yellow (Y) is allocated to the ink section 21*a*, a color of magenta (M) is allocated to the ink section 21*b* and a color of cyan (C) is allocated to the ink section 21*c* in the area a on the layer of suitable film which constitutes a main body of the thermal transfer ribbon 15. Alternatively, it may includes four ink sections 21*a*, 21*b*, 21*c* and 21*d* arranged one after another in the longitudinal direction in the area b on the layer of film. In this case a color of yellow (Y) is allocated to the ink section 21*a*, a color of magenta (M) is allocated to the ink section 21*b*, a color of cyan (C) is allocated to the ink section 21*c* and a color of black (B) is allocated to the ink section 21*d*. The image building section 5 is operated such that at every time when each of the colors are mentioned above is transferred onto paper P, the latter is restored to the initial position and by repeating the above-mentioned steps the required number of colors are successively superimposed one above another.

The thermal transfer ribbon with the black ink section 21*d* includes therein is put in use when there is a requirement for clearly exhibiting a color of black. However, it is found that a color very close to real black can be exhibited by superimposing three colors comprising yellow, magenta and cyan one above another without necessity for the black ink section 21*d*.

By rotating the platen 10 the paper P is reciprocably displaced at the same times as the number of colors in the above-described manner. While it is reciprocably displaced in that way, it is brought onto first and second guides 23 and 24 which are disposed in the inclined posture below the paper discharge tray 22.

Now, reciprocable movement of the paper P will be described below with reference to FIGS. 6(A) to (D).

Figure 6A:
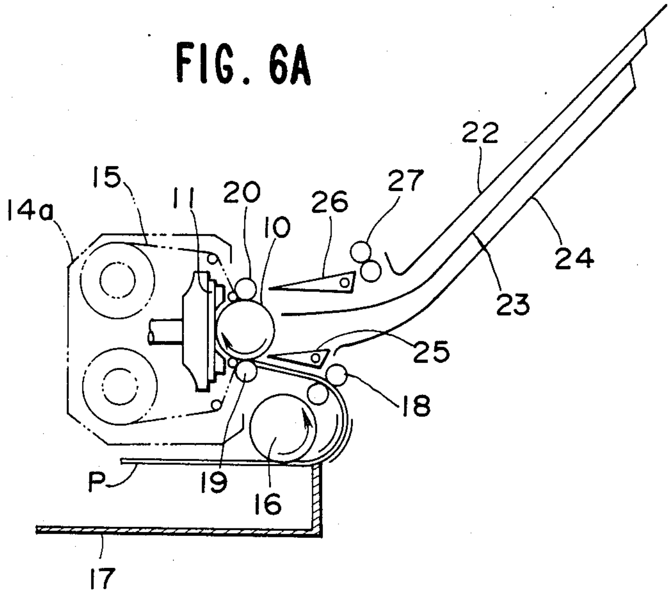
FIG. 6 (A)
FIG. 6B, FIG. 6C, FIG. 6D are fragmental vertical sectional views of the image building apparatus respectively, particularly illustrating how paper is reciprocably displaced during multicolor transference.

After a paper P is taken out from the paper feeding cassette 17, it is delivered to the platen 10 via the pair of regist rollers 18 and the first distributing guide 25 which has assumed the illustrated position and it is then partially wound about the platen 10 (see FIG. 6(A)).

When the platen 10 is rotated by means of a pulse motor serving as rotational power source which is not shown in the drawings, the paper P is displaced at a predetermined speed. At this moment a number of heating elements (not shown) disposed on the thermal head 11 in the line-dot arrangement in the axial direction of the platen 10 are heated in response to transmitted image informations whereby ink 21 on the thermal transfer ribbon 15 is transferred onto the paper P.

Figure 6B:
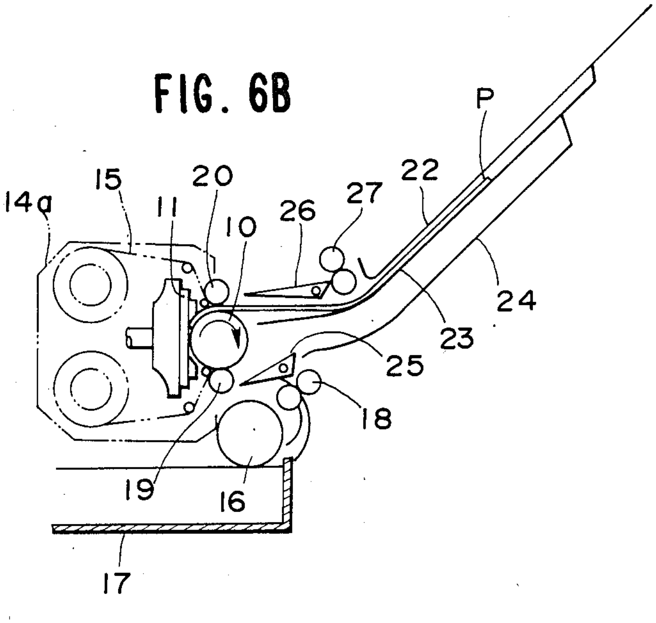

After the fore end part of the upper P leaves the platen 10, it is brought onto the first guide 23 extending in parallel with the paper discharge tray 22 in the area located below the latter via the second distributing guide 26 which has assumed the illustrated position (see FIG. 6(B)).

Figure 6C:
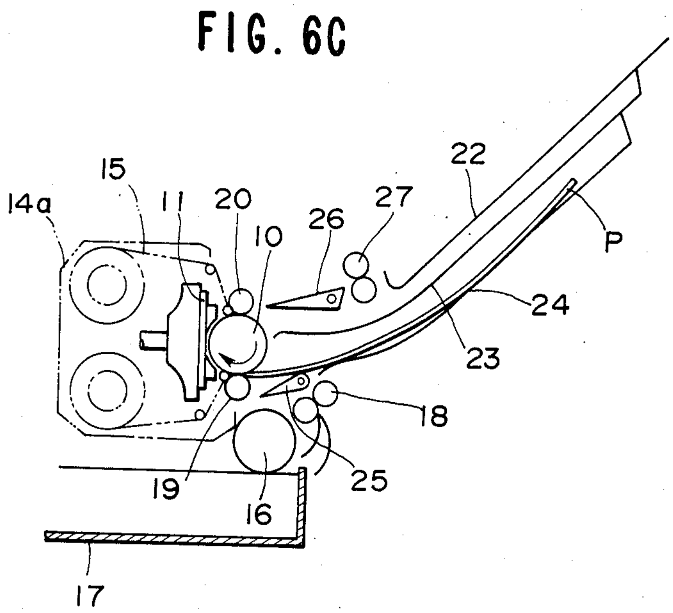

The paper P with ink 25 having a certain color transferred thereto is then displaced reversely as the platen 10 is rotated in the reverse direction, until it is brought onto the second guide 24 extending in parallel with the first guide 23 in the area located below the latter via the first distributing guide 25 which has been turned to the illustrated position in the anticlockwise direction (see FIG. 6(C)).

Thus, by reciprocably displacing the paper P in the above-described manner at the same times as the number of colors transference of plural colors is achieved.

Figure 6D:
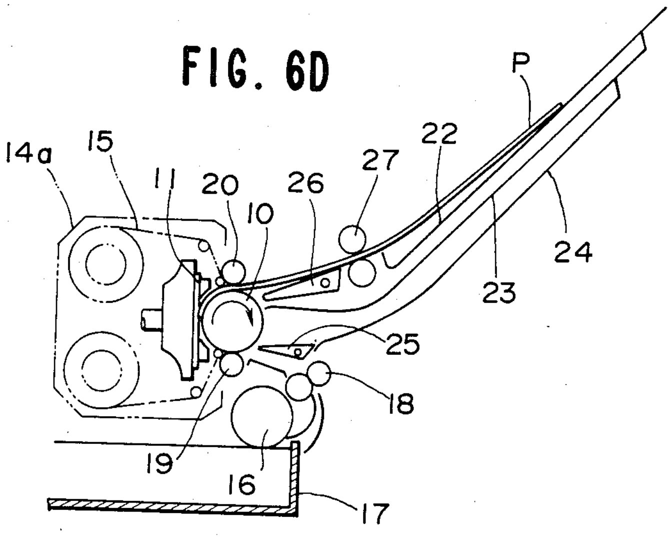

Finally, after all kinds of color inks 21 are transferred onto the paper P, it is discharged onto the paper discharge tray 22 via the second distributing guide 26 which has been turned to the illustrated position in the counterclockwise direction as a pair of paper discharge rollers 27 are rotated (see FIG. 6(D)).

Figure 7:
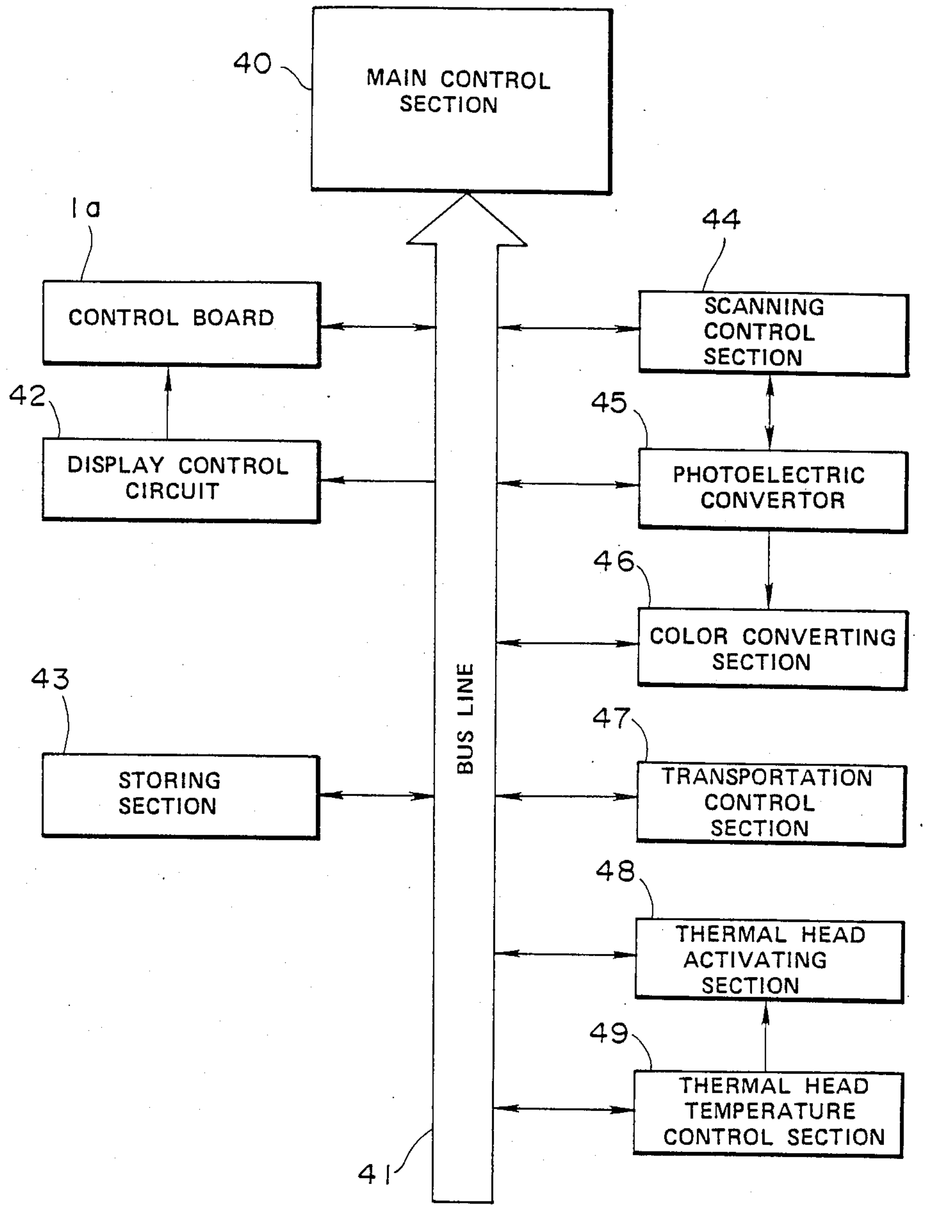
FIG. 7 is a block diagram illustrating a control system for the whole apparatus.

FIG. 7 is a block diagram which schematically illustrates a control system for the whole apparatus. Namely, in the drawing reference numeral 40 designates a main control section which serves to control operations of the whole apparatus. The main control section 40 is generally constituted by a central processing unit and its associated components and a bus line 41 is connected to the main control section 40. Further, control board 1*a*, display control circuit 42, storing section 43, scanning control section 44, converting section 45, color converting section 46, photoelectric control section 47, thermal head activating section 48 and thermal head temperature control section 49 are connected to the bus line 41 respectively.

Specifically, the display control circuit 42 is activated in response to signals transmitted from the main control section 40 via the bus line 41 so as to control operation of the display section 6 on the control board 1*a*. The storing section 43 is activated in response to signals transmitted from the main control section 40 via the bus line 41 so as to store information transmitted via the bus line 41 or read the thus stored information as required. The scanning control section 44 is activated in response to signals transmitted from the main control section 40 via the bus line 41 so as to control turning-on and -off of the front lamp 9A in the movable scanning section 9 and operations of the photoelectric convertor 45 and the scanning motor which is not shown in the drawings. The photoelectric convertor 45 detects images on an original in response to signals transmitted from the main control section 40 via the bus line 41 and then outputs signals for each of the above-mentioned colors. The color converting section 46 receives signals thus outputted from the photoelectric convertor 45 and processes them to convert them into color signals for each of inks having yellow, magenta, cyan and black colors. Thus converted color signals are outputted to the bus line 41. Further, the color converting section 46 effects color conversion also in response to signals transmitted from the bus line 41 and then outputs new signals to the bus line 41. The transportation control section 47 is activated in response to signals transmitted from the main control section 40 via the bus line 41 so as to control operations of the motor for driving the platen 10, the motor (not shown) for driving cores of the ribbon cassette 14*a*, the motors for rotating the regist rollers 18 and the paper discharge rollers 27 and the solenoids (not shown) for turning the first and second distributing gates 25 and 26. The thermal head activating section 48 is activated in response to signals transmitted from the main control section 40 via the bus line 41 as well as signals transmitted from the thermal head temperature control section 49 so as to control turning-on and -off of the heating elements on the thermal head 11. Finally, the thermal head temperature control section 49 outputs temperature control signals to the thermal head activating section 48 in response to signals transmitted from the main control section 40 via the bus line 41.

Next, description will be made below as to a ribbon cassette in accordance with an embodiment of the invention with reference to FIGS. 8 to 13.

Figure 8:
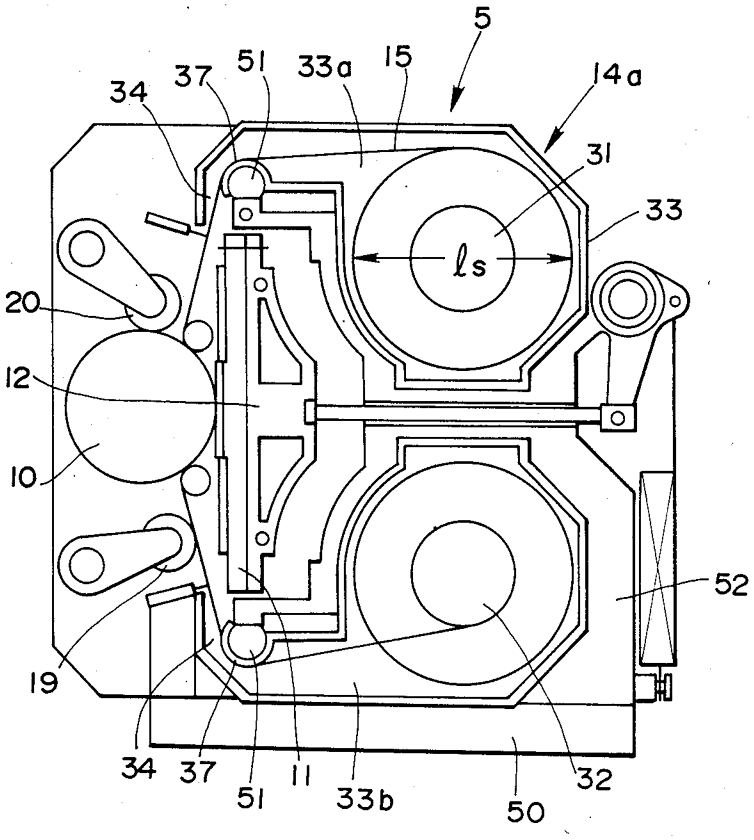
FIG. 8 is a vertical sectional side view of a transfer material holding cassette in accordance with an embodiment of the invention, illustrating how it is fitted to the housing of the apparatus.

FIG. 8 is a vertical sectional view of a ribbon cassette incorporated in the image building section. In the drawing reference numeral 50 designates a printer frame. The printer frame 50 has a bracket 52 fixedly mounted thereon so as to detachably hold a ribbon cassette 14*a* and a pair of cassette support shafts 51 are fixedly secured to the bracket 52 while extending in parallel with the axis of the platen roller 10. The ribbon cassette 14a includes two cores 31 and 32 which extend in parallel with one another so that both the ends of the thermal transfer ribbon 15 are anchored at the cores 31 and 32 in such a manner that they are wound about the latter. It should be noted that a part of the thermal transfer ribbon 15 is exposed to the outside in the area are defined between the platen 10 and the thermal head 11 when it is set in the case 33 while its both ends are wound about the cores 31 and 32.

Figure 9:
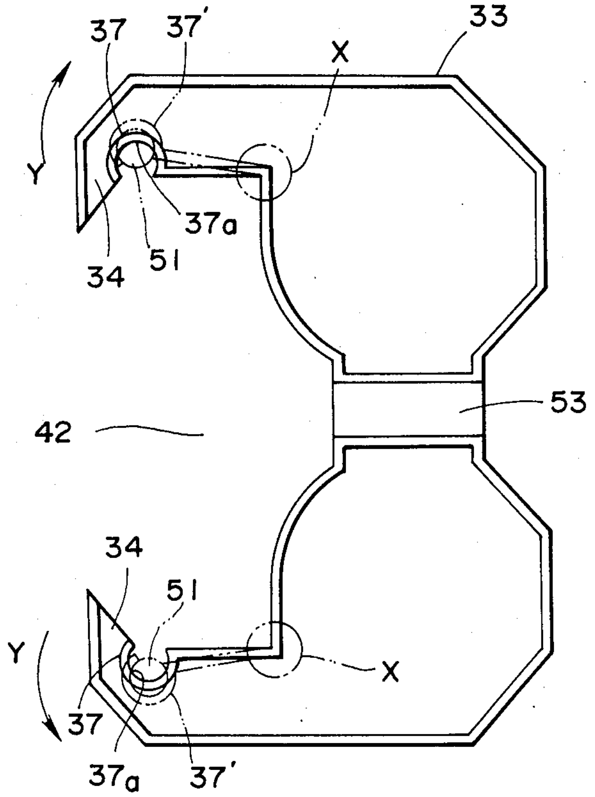
FIG. 9 is a vertical sectional view of a case constituting the transfer material holding cassette.

As will be best seen from FIG. 9, the case 33 is formed with an opposing pair of axially extending openings 34 in the core housing portions 33*a* and 33*b* which are oriented toward the cores 31 and 32. Further, the case 33 is integrally formed with a pair of guides 37 having the arch-shaped configuration at the position located in the proximity of the openings 34 so as to guide movement of the thermal transfer ribbon 15 during winding and unwinding of the latter about cores 31 and 32. A shaft 51 is inserted through each of the semicircular hollow spaces as defined by the inner walls of the guides 37.

Next, description will be made below as to how the shafts 51 are fitted into the guides 37.

Figure 10A:
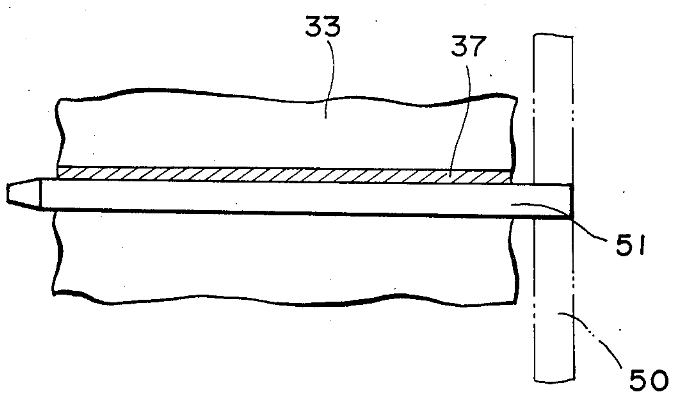
FIG. 10 (A) and FIG. 10B are fragmental sectional views of the cassette respectively, particularly illustrating how a cassette support shaft is engaged to the guide.
Figure 10B:
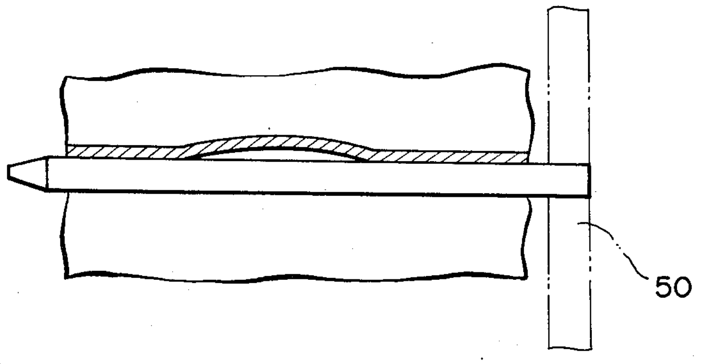

FIG. 9 is a vertical sectional view of the case 33. The pair of guides 37 are so designed that a distance therebetween increases due to their elastic deformation when the shaft 51 is inserted through the cylindrical hollow space as defined by each of the inner walls 37a thereof. Specifically, when the shaft 51 is inserted through the thus defined cylindrical hollow space, a part of the case 33 located around the guide 37 is caused to turn about the X section on the case 33 in the direction as identified by reference letter Y in the drawing whereby the guide 37 is elastically displaced to the position 37' as represented by phantom lines. Thus, the inner wall 37a of the guide 37 is brought in close contact with the shaft 51 under the effect of elastic force. Accordingly, even in the case where the guide 37 has uneven area in the axial direction which is caused at a time when it is molded integral with the case 33 using certain resin, the aforesaid uneven area is correctly straightened as illustrated in FIG. 10(A). As a result, the whole inner wall 37a of the case 33 comes in close contact with the whole outer surface of the shaft 51, because the guide 37 extends straightly in the axial direction. Thus, there is no fear of failing to inhibit a clearance from appearing between the outer surface of the shaft 51 and the inner wall of the guide 37 as is often seen with the conventional cassette as illustrated in FIG. 10(B). This leads to such a result that the thermal ink ribbon 15 is reciprocably displaced along the outer surfaces of the guides 37 without an occurrence of damaging, clogging or the like malfunction of the thermal transfer ribbon 15 due to inclined movement or snake motion of the latter.

Figure 11:
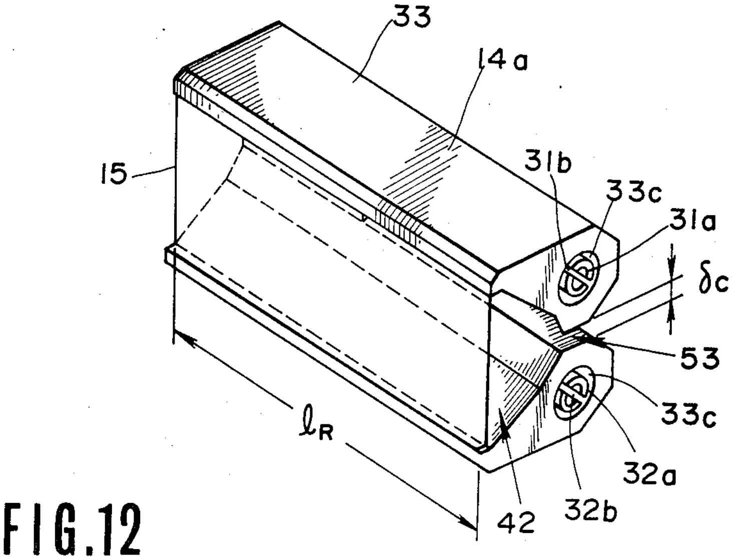
FIG. 11 is a perspective view of the cassette.
Figure 12:
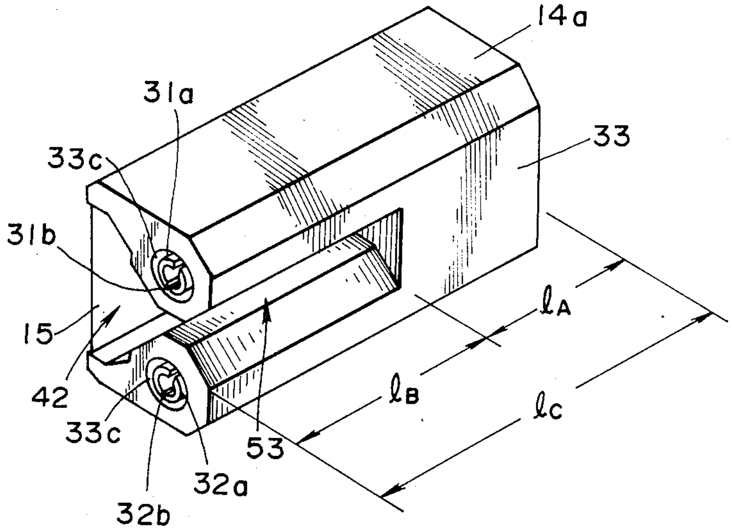
FIG. 12 is another perspective view of the cassette as seen in the different direction from that in FIG. 11.
Figure 13:
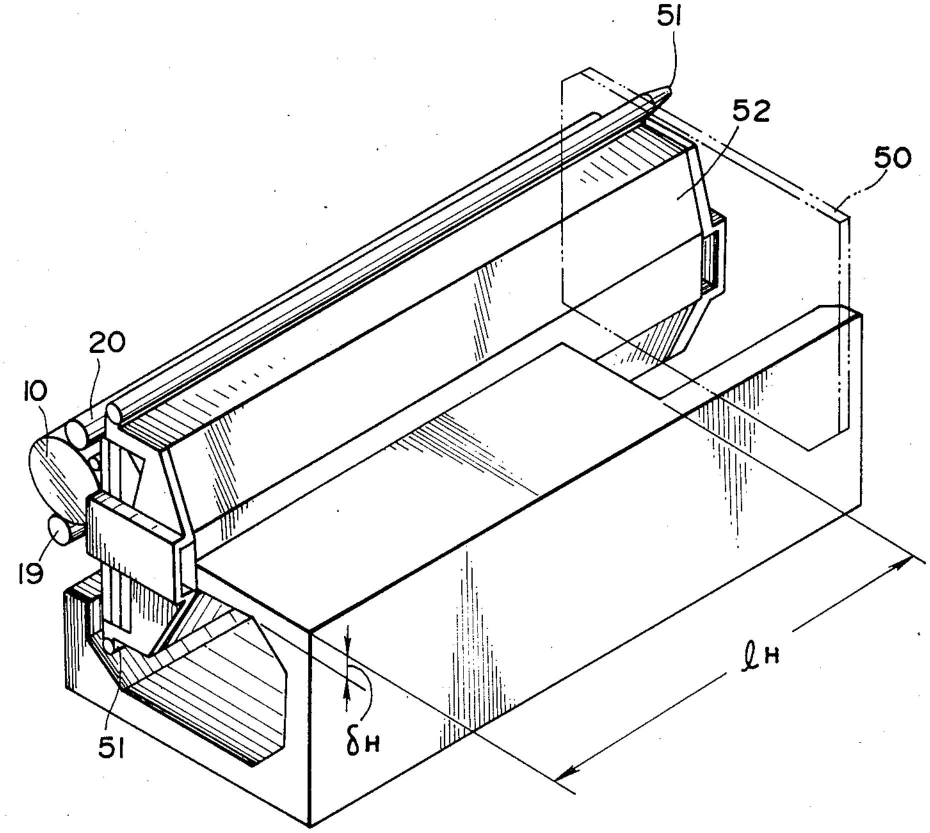
FIG. 13 is a perspective view of the cassette, particularly illustrating how the cassette is operatively engaged to the thermal head holder in cooperation with the platen roller.

As illustrated in FIGS. 11 and 12, the case 33 is provided with rotational power receiving end portions 31a and 32a on the one end face at the position located in alignment with the cores 31 and 32 so that driving shafts of motors which are not shown in the drawings are operatively connected to the rotational power receiving end portions 31a and 32a which are held in bores 33c on the one end wall of the case 33. Specifically, the rotational power receiving end portions 31a and 32a are constituted by slotted ends of the cores 31 and 32 at which slots 31b and 32b are formed. When the ribbon cassette 14a is fitted to the housing 1 at the predetermined position, engagement projections at the shaft ends of the motors serving as coupling are caused to come in engagement to the slots 31b and 32b whereby rotational power of the motors is alternately transmitted to the core 31 or 32.

As is apparent from the drawings, the case 33 of the ribbon cassette 14a has an open space 42 having the U-shaped cross-sectional configuration as defined by the exposed part of the thermal transfer ribbon 15 and the inner wall of the case 33 so as to receive therein a combination of the holder 12 and the thermal head 11. The geometrical configuration of the open space 42 will be described below in more details.

The width $l_R$ of the thermal transfer ribbon 15 (see FIG. 11) is determined larger than the maximum diameter $l_S$ of a ribbon coil wound about the cores 31 and 32 (see FIG. 8) and the depth $l_B$ of a slit 53 on the case as measured from the lefthand end of the latter (see FIG. 12) is determined larger than a half of the width $l_R$ of the thermal transfer ribbon 15. Thus, an inequality $l_B > (1/2) l_R$ is established. As will be best seen from FIG. 12, the ribbon cassette 14a is so designed that the case 33 having the width $l_C$ is constituted by three parts, one of them being a junction part having the width $l_A$ and the other two part parts being upper and lower parts having the width $l_B$ with the slit 53 formed therebetween. Further, the opening $\delta_C$ of the slit 53 is determined appreciably larger than the thickness $\delta_H$ of the bracket 52 (see FIG. 13) and moreover the depth $l_B$ of the slit 63 is determined substantially same to the width $l_H$ of the bracket 52 (see FIG. 13).

Now, fitting of the ribbon cassette 14a to the housing 1 is effected by way of the steps of locating the free ends of the shafts 51 in alignment with the open ends of the guides 37 and then pushing the ribbon cassette 14a forwardly by force in the longitudinal direction (in the axial direction of the platen) while the open end face of the slit 53 is located opposite to the end face of the bracket 52. On the contrary, removing of the ribbon cassette 14a from the housing 1 is effected by way of the steps reverse to those as mentioned above.

According to the embodiment of the invention as described above the ribbon cassette 14a is fitted to the housing 1 by engaging the slit 53 of the ribbon cassette 14a to the bracket 52 and inserting the shafts 51 into the cylindrical hollow space as defined by the inner wall 37a of each of the guides 37. At this moment both the guides 37 are deflected outwardly as illustrated by phantom lines in FIG. 9 whereby the inner walls 37a of the guides 37 are brought in close contact with the outer surfaces of the shafts 51. As a result, uneven part of the guide 37 which has been developed at a time of molding operation is eliminated and thereby the guide 37 can be corrected straightly. Accordingly, there can be reliably inhibited an occurrence of malfunction such as damaging or clogging of the thermal transfer ribbon 15 due to inclined movement or snaking motion of the thermal transfer ribbon 15 which is reciprocably displaced along the outer surface of the guides 37 to be wound or unwound about the cores. Moreover, there is no fear of causing transference to be effected at the dislocated position.

While the present invention has been described above with respect to a single embodiment thereof, it should of course be understood that it should not be limited only to this but various changes or modifications may be made in any acceptable manner without departure from the spirit and scope of the invention. For instance, the cross-sectional configuration of the guides should not be limited only to the arch-shaped one but it may assume a polygonal cross-sectional configuration such as triangle, square or the like which is determined corresponding to that of the shafts adapted to be operatively engaged to the guides. Further, the manner of deformation of the guides at a time of fitting the thermal transfer material holding cassette to the housing should not be limited only to the above-described embodiment. Alternatively, parts located in the proximity of the open end of the hollow space may be deformed outwardly together with the guides. Further, in the illustrated embodiment the ribbon cassette is firmly fitted to the housing by engagement of the bracket to the slit or engagement of one member to another member. Alternatively, each of the guides may be designed in the plate-shaped configuration so that they are forcibly displaced in the predetermined direction using shafts, blocks or the like means. What is required for the ribbon cassette of the invention is that guides adapted to be mechanically engaged to support members on the housing are previously dislocated by a certain distance before it is fitted to the housing in order to assure that the inner walls of the guides are brought in uniform close contact with the support members while a certain part of the bracket located in the proximity of the sliding area of the thermal transfer material is deformed outwardly in the expanded state when it is practically fitted to the housing.

What is claimed is:

1. A transfer material holding cassette for use in an image forming apparatus including a platen roller, said cassette being of the type including (1) transfer material in the form of ribbon of which one surface is coated with coloring agents;

(2) first and second cores for reciprocably displacing said transfer material in such a manner as to wind the latter about one core and unwind it from the other one; and (3) a case for containing the transfer material and both the cores, said case including arm-shaped first and second guide members disposed in confronting relation to each other to smoothly guide reciprocable movement of the transfer material between the cores, said image forming apparatus having a housing and first and second support shafts disposed in parallel with an axis of said platen roller for supporting said cassette in said housing, said first guide member being mechanically engaged with the first support shaft and said second guide member being mechanically engaged with the second support shaft so that said transfer material holding cassette is detachably mounted in said housing of said image forming apparatus, the improvement consisting in that said first and second guide members are made of elastic material, and the distance between said first and second guide members is different than the distance between said first and second support shafts when said cassette is not mounted in the housing of the image forming apparatus whereby one wall of each of the guide members is brought in uniform close contact with the surface of the corresponding support shaft when the cassette is mounted in the housing.

2. A transfer material holding cassette as defined in claim 1, wherein each of said first and second guide members is formed with a groove thereon for receiving said first and second support shaft, respectively.

3. A transfer material holding cassette as defined in claim 2, wherein said first and second guide members are elastically deformed in such a manner that the distance between them increases when said first and second support shafts are engaged with the first and second guide members whereby the inner wall of each of the first and second guide members is brought in uniform close contact with the outer surface of the corresponding support shaft.

* * * * *